United States Patent [19]

Koop et al.

[11] Patent Number: 4,825,445
[45] Date of Patent: Apr. 25, 1989

[54] FLOWING GAS LASER DISCHARGE TUBE STRUCTURE

[75] Inventors: Dale E. Koop, Sunnyvale; Robert E. Basanese, San Jose, both of Calif.

[73] Assignee: Rofin-Sinar, Inc., San Jose, Calif.

[21] Appl. No.: 196,484

[22] Filed: May 19, 1988

[51] Int. Cl.$^4$ ............................................... H01S 3/03
[52] U.S. Cl. ........................................ 372/61; 372/58
[58] Field of Search ................... 372/58, 61, 72, 88, 372/701

[56] References Cited

U.S. PATENT DOCUMENTS

| | | | |
|---|---|---|---|
| 3,528,030 | 9/1970 | Bickel et al. | 372/72 |
| 3,582,816 | 6/1971 | Waszak et al. | 372/72 |
| 3,868,593 | 2/1975 | Fukuda et al. | 372/88 |
| 4,694,463 | 9/1982 | Hirth et al. | 372/61 |

*Primary Examiner*—Léon Scott, Jr.
*Attorney, Agent, or Firm*—Donald C. Feix

[57] ABSTRACT

A co-axial laser tube structure of the kind used in a flowing gas laser has an inner axially extending tube for confining the flowing gas in a discharge region, a single pin cathode mounted adjacent the hot end of the inner tube, a single pin anode mounted intermediate the cool end and the hot end of the inner tube, a gas entrance orifice for permitting gas to flow from the exterior tube into the interior of the tube at the location of the anode electrode means, and an outer tube which is separate from and which extends co-axially with the inner tube. The outer tube is made of plastic and conducts flowing gas along the outside of the inner tube from the cool end to the gas entrance orifice. The co-axial laser tube structure includes tube installation and mounting means effective to permit installation and/or replacement of the inner and outer tubes without the need for subsequent adjustment or bore registration of the tubes. The inner surface of the inner tube is frosted to minimize parasitic modes which could be produced by diffracted light impinging on the inside surface of the inner tube at a grazing angle and also for decreasing the boundary layer of thickness to improve turbulence in the gas flow between the anode and the cathode. The installation and mounting means include shaft seals, chamfers and related O-rings which are effective to hold the co-axial laser tube structure in registration with the bore without over constraint. The centering ring at the hot end of the inner tube has an aperature which shadows the glass tube from any diffracted light of the laser beam. This centering ring has an inner gas flow opening which is curved with a sufficiently large radius to eliminate any turbulence in the gas flow through the opening. A downstream diffuser recovers some velocity head of the gas flowing through the centering ring.

20 Claims, 1 Drawing Sheet

U.S. Patent   Apr. 25, 1989   4,825,445
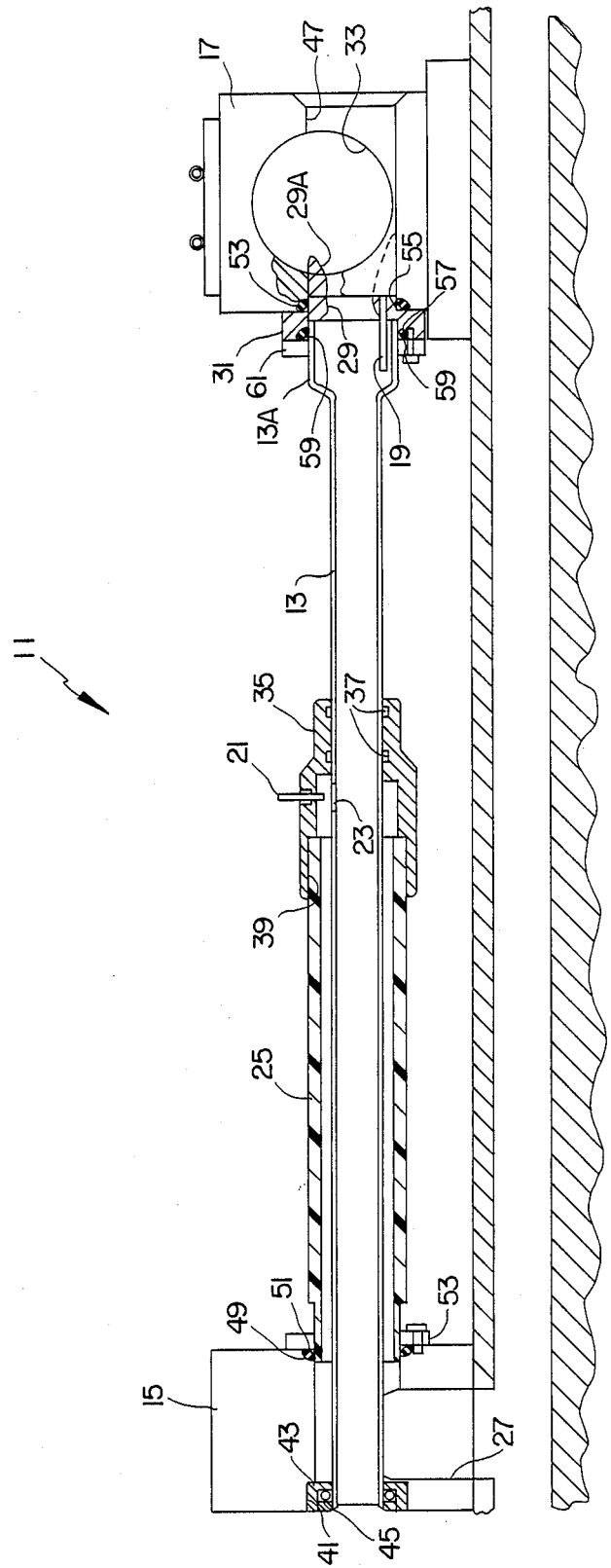

FLOWING GAS LASER DISCHARGE TUBE STRUCTURE

BACKGROUND OF THE INVENTION

This invention relates to a co-axial tube structure of the kind used in a flowing gas laser.

This invention relates particularly to a co-axial laser tube structure and related mounting structure which permit installation and/or replacement of the tubes without the need for subsequent adjustment or bore registration of the tubes.

In specific embodiments of the present invention the flowing gas is carbon dioxide gas, and the gas flows axially through a co-axial tube structure in the same general way as described in copending U.S. patent application Ser. No. 811,593, filed Dec. 19, 1985 by Joseph F. Rando, et al. and entitled "Fast Axial Flow Laser Circulating System" and assigned to the same assignee as the assignee of this present application.

The gas flow path through the co-axial laser tube structure of the present invention is also generally like that shown in pending U.S. patent application Ser. No. 863,632, filed Nov. 14, 1986 by Robert B. Slusher, et al. and entitled "Fast Axial Flow Carbon Dioxide Laser" and assigned to the same assignee as the assignee of this present application.

The optics used in conjunction with the co-axial tube laser structure of the present invention, and the apparatus and techniques for maintaining the registry of the mounting blocks with respect to one another are substantially the same as that disclosed in pending U.S. patent application Ser. No. 034,342, filed Apr. 3, 1987 by Dale E. Koop and entitled "Cube Corner Polarizer" and assigned to the same assignee as the assignee of this present application.

Each of these three pending U.S. patent application Ser. Nos. 811,593 and 863,632 and 034,342 is incorporated by reference in the present application.

In flowing gas lasers of this kind two or more sets of co-axial laser tube structures may be used in tandem (and/or in parallel by means of a cube corner construction) to make up the complete light path between the reflecting mirrors.

The installation and the replacement of these co-axial tube structures require that the tube structure be installed in registry with the bore axis of the laser mode. Maintaining proper registry can present problems during either initial installation or subsequent replacement.

The co-axial construction of the tube structures can result in rather expensive tube constructions if blown glass techniques are used to make one piece, integral tube structures.

One piece, integral co-axial tube structures can also present special problems in installation and replacement.

A relatively high level of electrical power is required to produce the electrical discharge between the anode and cathode in high power carbon dioxide flowing gas lasers, and such high levels of electrical power can present problems of arcing at both the anode and the cathode.

Maintaining good gas flow dynamics can also be a problem with flowing gas lasers. Any losses because of undesired turbulence outside the discharge area, unrecovered pressure head drops or excessive thicknesses of boundary layer conditions can reduce the overall efficiency of the laser.

The hot end of the inner tube is subjected to substantial heat. This heat, particularly in combination with any impingement of parasitic modes on the end surface of the hot end of this tube, can result in chipping of the tube. Chipping of the end of the tube can require replacement of the tube.

SUMMARY OF THE INVENTION

It is a primary object of the present invention to construct a co-axial laser tube structure which eliminates or overcomes problems presented by prior co-axial laser tube structures.

A co-axial laser tube structure constructed in accordance with the present invention includes an inner axially extending tube for containing the flowing gas in the discharger region.

Cathode electrode means are mounted adjacent the hot end of the inner tube.

Anode electrode means are mounted intermediate the cool end and the hot end of the inner tube.

The inner tube has a gas entrance orifice for permitting gas to flow from the exterior of the tube into the interior of the tube at the location of the anode electrode means.

An outer tube is separate from and extends co-axially with the inner tube and provides a passageway for conducting flowing gas along the outside of the inner tube from the cool end to the gas entrance orifice.

The present invention incorporates tube installation and mounting means which are effective to permit installation and/or replacement of the inner and outer tubes without requiring subsequent adjustment or subsequent bore registration of the tubes.

The laser tube structure is a composite structure in which the inner tube is made of glass and the outer tube is made of a high temperature rigid plastic. The separate construction of the inner and outer tubes and the composite glass and plastic structure of the inner and outer tubes permit the inner tube to be constructed of ordinary high temperature resistant glass without having to resort to a more expensive blown glass structure as would be required with an integral all glass tube structure.

The inside surface of the inner, glass tube is preferably provided with a frosted surface. The frosted surface minimizes parasitic modes which could be produced by diffracted light impinging on the inside surface of the inner tube at a grazing angle. This frosted surface also decreases the boundary layer thickness to improve turbulence in the gas flow between the anode and the cathode.

The tube installation and mounting means include mounting blocks at the opposite ends of the co-axial laser tube structure. The mounting blocks are maintained in exact registry with one another. The cool end of the inner tube is mounted in its related mounting block by a shaft seal which has a rigid metal outer ring and a co-acting plastic inner ring effective to hold the end of the inner glass tube in register with the bore without over constraint.

The tube installation and mounting means include a metal centering ring at the hot end of the inner tube.

The mounting block for the hot end of the inner tube has a chamfered opening for holding the centering ring and has an O-ring engaged between the chamfered opening and the centering ring. The centering ring is preferably anodized aluminum and has a chamfered opening and a related O-ring effective to hold the hot end of the glass tube in bore registry without over constraint.

The centering ring has an aperature which shadows the glass tube from any diffracted light of the laser beam.

The inner tube has an enlarged diameter in the part associated with the centering ring. The cathode electrode constitutes a single cathode pin which extends through the centering ring and which is disposed within the enlarged end of the glass tube and outside of the diameter of the laser mode.

The centering ring has an inner opening for gas flow through the opening and the side wall of the opening is curved with a sufficiently large radius to eliminate any turbulence which could result from a sharp edge construction at that point in the gas flow path.

This opening in the centering ring forms a nozzle and the centering ring preferably includes a diffuser portion for recovering some velocity head of the gas flowing downstream of the nozzle.

Co-axial laser tube structure and installation and operating techniques which are effective to function as described above constitute further, specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEW

FIG. 1 is a side elevation view, partly broken away in part to show details of construction, of a co-axial laser tube structure constructed in accordance with one embodiment of the present invention.

DETAILED DESCRIPTION OF THE PREFERRED EMBODIMENTS

A co-axial laser tube structure constructed in accordance with one embodiment of the present invention is indicated generally by the reference numeral 11 in FIG. 1.

The co-axial laser tube structure 11 includes an inner axially extending tube 13 for confining the flowing gas in the discharge region. The tube 13 has a cool end and a hot end. The cool end is supported in a mounting block 15, and the hot end is supported in a mounting block 17.

The laser tube structure 11 includes a single pin cathode electrode 19 adjacent the hot end of the inner tube 13 and a single pin anode electrode 21 mounted intermediate the cool end and the hot end of the inner tube 13.

The inner tube 13 has a gas entrance orifice 23 for permitting gas to flow from the exterior of the tub 13 into the interior of the tube at the location of the anode electrode 21.

In accordance with the present invention a separate outer tube 25 extends coaxially with and is spaced outwardly from the inner tube 13. The outer tube extends from the mounting block 15 at the cool end of the inner tube 13 to the anode electrode 21 and serves as a conduit for conducting flowing gas from a passageway 27 in the mounting block 15 to the orifice 23.

The flowing gas then flows through the orifice 23 through the bore of the tube 13, past the single pin cathode electrode 19 and through a central opening 29 in a metal centering ring 31.

The metal centering ring 31, with selected structure, supports the hot end of the inner tube 13 within the mounting block 17 as will be described in more detail below.

The gas flowing through the central opening 29 flows into a gas flow passageway 33 in the mounting block 17 and is then conducted to a heat exchanger (not shown) before being returned to the laser tube inlet passageway 27 in the mounting block 15.

In a specific embodiment of the present invention the flowing gas is carbon dioxide gas and the gas flows axially through the co-axial tube structure 11 in FIG. 1 in the same general way as described in copending U.S. patent application Ser. No. 811,593, filed Dec. 19, 1985 by Joseph F. Rando, et al. and entitled "Fast Axial Flow Laser Circulating System" and assigned to the same assignee as the assignee of this present application.

The gas flow path through the co-axial laser tube structure 11 shown in FIG. 1 is also generally like that shown in pending U.S. patent application Ser. No. 863,632, filed Nov. 14, 1986 by Robert B. Slusher, et al. and entitled "Fast Axial Flow Carbon Dioxide Laser" and assigned to the same assignee as the assignee of this present application.

The optics used in conjunction with the co-axial laser tube structure 11 shown in FIG. 1 (and the apparatus and techniques for maintaining exact registry of the mounting blocks and 17 with respect to one another in the co-axial laser tube structure shown in FIG. 1) are substantially the same as that disclosed in pending U.S. patent application Ser. No. 034,342 filed Apr. 3, 1987 by Dale E. Koop and entitled "Cube Corner Polarizer" and assigned to the same assignee as the assignee of this present application.

Each of these three pending U.S. patent application Ser. Nos. 811,593 and 863,632 and 034,342 is incorporated by reference in the present application in accordance with the provisions of Section 608.01(p)B of the *Manual of Patent Examining Procedure* of the United States Patent and Trademark Office.

The function of the inner tube 13 is to confine the gas involved in the discharge occurring between the anode 21 nd the cathode 19. The energy of the discharge heats the tube 13, so this tube is made of high temperature resistant glass, such as Pyrex glass.

The function of the outer co-axial tube 25 is to conduct flowing gas from the passageway 27 to the inlet orifice 23. In the present invention this tube 25 is made of a high temperature CPVC (chlorinated polyvinyl chloride) material. It is a high temperature, rigid and inexpensive plastic which can be used in this part of the tube assembly because the tube 25 is not subjected to the higher temperatures existing between the anode 23 and the cathode 19.

The use of separate tube structures for the inner tube and the outer tube and the use of an inexpensive plastic material for the outer tube reduces the overall cost considerably (in comparison to prior tube structures in which the co-axial tube structure was made as a unitary structure using a blown glass fabricating technique).

In the present invention the inner tube 13 can be made of ordinary high temperature resistant glass and the straightness can be checked by a mandrel.

The outer plastic tube 25 is mounted, at the right hand end as viewed in FIG. 1, on the inner tube 13 by a sleeve member 35 which is preferably made of metal.

The sleeve 35 is sealed to the outer surface of the tube 13 by O-ring seals 37.

The anode pin 21 is potted into the sleeve 35.

The right hand end of the outer tube 25 may also be potted or bonded into a counter bore 39 of the sleeve member 35 by a CPVC material.

The cool end of the inner tube 13 is mounted within a bore 41 of the mounting block 15 by a shaft seal 43. The shaft seal 43 comprises a metal outer ring and an inner resilient lip 45. The resilient lip 45 is made of a material which is high temperature resistant and which is also resistant to any ozone effects. The lip 45 is made of a PFEE or a PTFE type of stereofluorocarbon plastic material. One particular material that has been found satisfactory is the Viton shaft seal material made by the Dupont company.

This shaft seal 43 permits the tube 13 to be inserted into position within the bore 41 of the mounting block 15 by axial movement of the tube. Once that end of the tube has been inserted into the shaft seal in the block, the shaft seal is effective to hold that end of the tube in registry with the related bore 47 in the mounting block 17 without further adjustment or further bore registration of that end of the tube 13.

The corresponding end of the outer tube 25 is held in position in the mounting block 15 by a chamfer 49, a related O-ring 51 and a retaining ring 53. The chamfer and O-ring hold this end of the outer tube 25 in place without the need for further adjustment or bore registration and without undue constraint.

At the right hand end, as viewed in FIG. 1, the inner tube 13 is mounted in the block 17 by the metal centering ring 31. The metal centering ring 31 is held in position within the block 17 by means of a chamfer 53 and a related O-ring 55. The centering ring 31 also has a chamfer 57 and an O-ring 59 effective to hold the end of the tube 13 in proper registration within the mounting block 17 without the need for further adjustment or further bore registration of the tube. An aluminum retaining ring 61 retains the tube 13 in assembled position.

The chamfers and O-rings provide effective alignment and bore registration of the tue 13 as installed and also hold the tube in place without over-restraint.

By making the tubes 13 and 25 separate, rather than as an integral, one piece unit, it is possible to move the tubes axially in a telescoping way with respect to one another during installation. This facilitates installation and replacement of the co-axial tube structure.

This adjustment free installation and bore registration of the co-axial tube structure 11 is a very important feature of the present invention.

The gas flow dynamics provided by the co-axial tube structure 11 are also important features of the present invention. First of all, the gas inlet flow through the orifice 23 has a rapid expansion to extinguish any tendency of arcing at the anode pin 21. This rapid expansion also creates turbulence to keep the discharge uniform.

The cathode 19 is a single pin cathode for long life and stable discharge. This construction is particularly useful to provide stable discharge during pulsing operation of the laser. This construction also avoids ground plane focusing.

The use of a single pin cathode 19 in the structure shown in FIG. 1 eliminates the susceptibility of arcing because there is no alternate path other than the path to the single pin cathode.

As illustrated in FIG. 1 the hot end of the tube 13 is flared to produce a larger diameter end portion 13A. The single pin cathode 19 extends through the centering ring 31 and is disposed within this larger diameter end portion 13A and outside the laser mode.

The single pin electrode 19 is potted in the centering ring 39 to hold the cathode in place.

The dynamics of the gas flow at the hot end of the tube 13 are also enhanced by the construction of the central opening 29 in the centering ring 31. The sidewall of this opening 29 is curved with a sufficiently large radius (greater than 8 to 1 ratio in the embodiment shown in FIG. 1) to eliminate any turbulence which could result from a sharp edge construction. The opening 29 forms a nozzle.

The opening 29 is also preferably formed with a diffuser portion 29A for recovering some velocity head of the gas flowing through the centering ring.

The inner diameter of the opening 29 is effective to shadow the tube 13 (and particularly the end edge of the enlarged diameter end portion 13A) from any defracted light of the laser mode. The diameter of this inner opening is enough smaller than the diameter of the tube 13 to prevent any defracted light from hitting the end of the tube 13 and thus prevents any chipping of the tube end.

This inner opening 29 is not the bore diameter limiting aperature. Such bore limiting aperatures are mounted at the optics of the laser (not shown in FIG. 11).

The tube shadowing function of the opening 29 is an important feature, because there may be four or more of the tube structures 11 used in a single flowing gas laser and the individual openings 29 provide a shadowing effect at locations intermediate the end optics of the overall laser.

The enlarged diameter 13A at the hot end of the inner tube 13 is also an important feature of the present invention because of the problems of gas chipping at this hot end of laser tubes of this kind.

The enlarged diameter helps to minimize the possibility of defracted or stray light hitting the tube at this location.

The fabrication of the glass tube 13 is controlled such that the outside diameter of the enlarged part 13A is concentric to the center line axis of the smaller diameter glass. This controls the tube in order to maintain the concentricity of the alignment of the glass.

In accordance with the present invention the inside surface of the tube 13 is preferably frosted, as by etching with hydrochloric acid, to provide a surface which minimizes parasitic modes which could be produced by defracted light impinging on the inside surface of the inner tube at a grazing angle. The frosted surface also decreases the boundary layer thickness to improve turbulence in the gas flow between the anode and the cathode.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A co-axial laser tube structure of the kind used in a flowing gas laser, said laser tube structure comprising,
   an inner axially extending tube for confining the flowing gas in the discharge region and having a cool end and a hot end,
   cathode electrode means mounted adjacent the hot end of the inner tube,
   anode electrode means mounted intermediate the cool end and the hot end of the inner tube,
   said inner tube having a gas entrance orifice for permitting gas to flow from the exterior of the tube into the interior of the tube at the location of the anode electrode means,
   an outer tube separate from and extending co-axially with, and spaced outwardly from the inner tube, said outer tube extending from the cool end of the inner tube to the anode electrode means for conducting flowing gas along the outside of the inner tube from the cool end to the gas entrance orifice, and
   tube installation and mounting means effective to permit installation and/or replacement of the inner and outer tubes without adjustment or bore registration of the tubes.

2. The invention defined in claim 1 wherein the laser tube structure is a composite structure in which the inner tube is made of glass and the outer tube is made of a high temperature rigid plastic.

3. The invention defined in claim 2 wherein the separate structure and the composite glass and plastic structure of the inner and outer tubes permit the inner tube to be constructed of ordinary high temperature resistant glass without having to resort to a more expensive blown glass structure as would be required with an integral all glass tube structure.

4. The invention defined in claim 2 including frosted surface means on the inside of the inner, glass tube for minimizing parasitic modes which could be produced by diffracted light impinging on the inside surface of the inner tube at a grazing angle and also for decreasing the boundary layer thickness to improve turbulence in the gas flow between the anode and the cathode.

5. The invention defined in claim 1 wherein the tube installation and mounting means include mounting blocks at the opposite ends of the laser tube structure and wherein the mounting blocks are maintained in register with one another.

6. The invention defined in claim 5 wherein the mounting block at the cool end of the inner tube includes shaft seal means having a rigid metal outer ring and a co-acting plastic inner ring effective to hold the end of the inner glass tube in alignment with the bore without over constraint.

7. The invention defined in claim 6 wherein the plastic ring is a PFEE or PTFE stereofluorocarbon plastic.

8. The invention defined in claim 1 wherein the tube installation and mounting means include a centering ring at the hot end of the inner tube.

9. The invention defined in claim 8 wherein the mounting block has a chamfered opening for holding the centering ring and has an O ring engaged between the chamfered opening and the centering ring and wherein the centering ring has a chamfered opening and has an O ring between said chamfered opening and the hot end of the glass tube effective to hold that end of the tube in bore alignment without over constraint.

10. The invention defined in claim 8 wherein the centering ring is made of anodized aluminum.

11. The invention defined in claim 8 wherein the centering ring has an aperture which shields the glass tube from any diffracted light of the laser beam.

12. The invention defined in claim 8 wherein the hot end of the inner tube has an enlarged diameter and the cathode electrode means include a single cathode pin which extends through the centering ring and which is disposed within the enlarged end of the glass tube outside the diameter of the laser beam.

13. The invention defined in claim 1 wherein the cathode electric means include a single pin cathode.

14. The invention defined in claim 8 wherein the centering ring has an inner opening for gas flow through the opening and wherein the side wall of the opening is curved with a sufficiently large radius to eliminate any turbulence which could result from a sharp edge construction.

15. The invention defined in claim 13 wherein the opening in the centering ring forms a nozzle and includes a diffuser portion for recovering some velocity dependent pressure drop of the gas flowing through the centering ring.

16. A co-axial laser tube structure of the kind used in a flowing gas laser, said laser tube structure comprising,
   an inner axially extending tube for confining the flowing gas in the discharge region and having a cool end and a hot end,
   cathode electrode means mounted adjacent the hot end of the inner tube,
   anode electrode means mounted intermediate the cool end and the hot end of the inner tube,
   said inner tube having a gas entrance orifice for permitting gas to flow from the exterior of the tube into the interior of the tube at the location of the anode electrode means,
   an outer tube separate from and extending co-axially with and spaced outwardly from the inner tube, said outer tube extending from the cool end of the inner tube to the anode electrode means for conducting flowing gas along the outside of the inner tube from the cool end to the gas entrance orifice, and
   wherein the laser tube structure is a composite structure in which the inner tube is made of glass and the outer tube is made of a high temperature rigid plastic.

17. A co-axial laser tube structure of the kind used in a flowing gas laser, said laser tube structure comprising,
   an inner axially extending tube for confining the flowing gas in the discharge region and having a cool end and a hot end,
   cathode electrode means mounted adjacent the hot end of the inner tube,
   anode electrode means mounted intermediate the cool end and the hot end of the inner tube,
   said inner tube having a gas entrance orifice for permitting gas to flow from the exterior of the tube into the interior of the tube at the location of the anode electrode means,
   an outer tube extending co-axially with and spaced outwardly from the inner tube, said outer tube extending from the cool end of the inner tube to the anode electrode means for conducting flowing gas along the outside of the inner tube from the cool end to the gas entrance orifice, tube mounting means for mounting the tubes in bore alignment in support blocks, said tube mounting means including a metal centering ring, for supporting the hot end of the inner tube and having a central gas flow opening effective to shield the inner glass tube from any diffracted light of the laser beam.

18. A co-axial laser tube structure of the kind used in a flowing gas laser, said laser tube structure comprising, an inner axially extending tube for confining the flowing gas in the discharge region and having a cool end and a hot end, cathode electrode means mounted adjacent the hot end of the inner tube, anode electrode means mounted intermediate the cool end and the hot end of the inner tube, said inner tube having a gas entrance orifice for permitting gas to flow from the exterior of the tube into the interior of the tube at the location of the anode electrode means, an outer tube extending co-axially with and spaced outwardly from the inner tube, said outer tube extending from the cool end of the inner tube to the anode electrode means for conducting flowing gas along the outside of the inner tube from the cool end to the gas entrance orifice, tube mounting means for mounting the tubes in bore registry in support blocks, said tube mounting means including a metal centering ring for supporting the hot end of the inner tube and having a central gas flow opening and wherein the side wall of the opening is curved with a sufficiently large radius to eliminate any turbulence which could result from a sharp edge construction.

19. The invention defined in claim 18 wherein the opening in the centering ring forms a nozzle and includes a diffuser portion for recovering some velocity dependent pressure drop of the gas flowing through the centering ring.

20. A method of supporting a co-axial laser tube structure of the kind used in a flowing gas laser in mounting blocks at opposite ends of the laser tube structure, said method comprising constructing an outer co-axial tube as a tube which is separate and distinct from an inner coaxial tube so that the two tubes can be moved in telescopic motion with respect to one another and with respect to related mounting block structure during installation and/or replacement of the tube assembly, mounting the cool end of the inner tube in a shaft seal which permits the inner tube to be moved longitudinally back and forth along its axis with respect to a mounting block during installation and/or replacement, mounting the cool end of the outer coaxial tube in a shaft seal which permits axial movement of that tube end with resect to the mounting block during installation and/or replacement, mounting the other end of the outer co-axial tube on a mid portion of the inner tube by a seal assembly which permits axial movement of the outer co-axial tube with respect to the inner tube during installation and/or replacement, mounting the hot end of the inner tube in a mounting block by a centering ring, chamfered openings and O ring mounting assembly which permits that end of the inner tube to be moved axially into and out of the mounting block, and wherein the mounting blocks are held in alignment with one another and the shaft seals and centering ring mounting assembly are effective to permit installation and/or replacement of the inner and outer tubes by holding the tubes in bore registration without subsequent adjustment or bore alignment of the tubes.

* * * * *

UNITED STATES PATENT AND TRADEMARK OFFICE
CERTIFICATE OF CORRECTION

PATENT NO. : 4,825,445  
DATED : April 25, 1989  
INVENTOR(S) : Koop, et al.

It is certified that error appears in the above—identified patent and that said Letters Patent is hereby corrected as shown below:

Col. 2, line 35, after "registration" insert --or alignment--.

Col. 4, line 38, "and 17" should read --15 and 17--.

Col. 4, line 53, "21 nd" should read --21 and--.

Col. 6, line 24, delete "head" and insert --dependent pressure drop--.

Col. 6, line 27, after "shadow" insert --or shield--.

Col. 7, line 4, after "co-axial" insert --composite--.

Col. 7, line 5, after "said" insert --composite--.

Col. 7, line 26, delete "registration" and insert --alignment--.

Col. 7, line 27, delete "the" and insert --said--.

Col. 7, line 28, delete "the laser".

Col. 7, line 29, delete "tube structure is a composite structure in which".

Col. 7, line 38, delete "as would be required with an".

Col. 7, line 39, delete "integral all glass tube structure".

Col. 7, line 42, delete "which could be produced".

Col. 7, line 43, delete "by diffracted light impinging on the inside surface of the".

Col. 7, line 44, delete "inner tube at a grazing angle".

Col. 7, line 51, delete "register" and insert --alignment--.

UNITED STATES PATENT AND TRADEMARK OFFICE
CERTIFICATE OF CORRECTION

PATENT NO. : 4,825,445

DATED : April 25, 1989

INVENTOR(S) : Dale E. Koop et al.

It is certified that error appears in the above-identified patent and that said Letters Patent is hereby corrected as shown below:

Col. 7, line 51, delete "register" and insert -- alignment --.

Signed and Sealed this

Sixteenth Day of January, 1990

*Attest:*

JEFFREY M. SAMUELS

*Attesting Officer*  *Acting Commissioner of Patents and Trademarks*